UNITED STATES PATENT OFFICE.

JOHN M. GIBLIN, OF SHEBOYGAN, WISCONSIN.

FIRE-EXTINGUISHING COMPOUND.

SPECIFICATION forming part of Letters Patent No. 310,887, dated January 20, 1885.

Application filed August 18, 1884. (No specimens.)

*To all whom it may concern:*

Be it known that I, JOHN M. GIBLIN, of Sheboygan, in the county of Sheboygan, and in the State of Wisconsin, have invented certain new and useful Improvements in Fire-Extinguishing Compounds; and I do hereby declare that the following is a full, clear, and exact description thereof.

My invention relates to compounds for extinguishing fires, and will be more fully set forth hereinafter.

My present invention is intended for use in connection with a closed vessel, of glass or analogous frangible material, substantially such as is described and claimed in my application for a patent for fire-extinguishers filed May 12, 1884, Serial No. 131,197, and which, briefly stated, consists in an outer vessel, made of glass or other frangible material, having an opening at one end filled with an apertured cork, containing in turn the neck or stem of another vessel extending within the outer vessel, and adapted to contain an explosive agent and a fuse, whereby when the same is exploded it will break both vessels and scatter the chemical contents of the outer vessel upon the fire.

Heretofore in that class of fire-extinguishers generally known as "hand-grenades" the usual effect of scattering the chemicals upon the flames has been to smother the fire, as ordinarily carbonic-acid gas is set free by the breaking of the grenade; but in the case of my present invention my chemicals are of such a nature that they operate to unite with the oxygen of the air surrounding the fire, which is thus instantly extinguished for want of oxygen to support combustion.

In carrying my invention into effect I generate sulphurous oxide by burning stick-sulphur or flowers of sulphur in a suitable furnace, draw the gas through a long coil of lead or glass pipe surrounded by pounded ice, and then by means of a force-pump I force the sulphurous oxide into one of the described empty vessels, the gas being reduced to a liquid form by cold and pressure. The vessel is then securely sealed by the described apertured cork and powder-flask, and in the event of its use being necessary, and the two vessels being broken by the explosion hereinbefore referred to, the sulphurous oxide is liberated, and rapidly unites with the oxygen of the air and extinguishes the flames for want of oxygen for them to feed upon.

Having thus described my invention, what I claim as new, and desire to secure by Letters Patent, is—

A fire-extinguisher consisting of a closed vessel, of glass or analogous frangible material, containing sulphurous oxide liquefied by previous cold and pressure, substantially as set forth.

In testimony that I claim the foregoing I have hereunto set my hand, at Milwaukee, in the county of Milwaukee and State of Wisconsin, in the presence of two witnesses.

JOHN M. GIBLIN.

Witnesses:
S. S. STOUT,
H. J. FORSYTHE.